Figure 1:
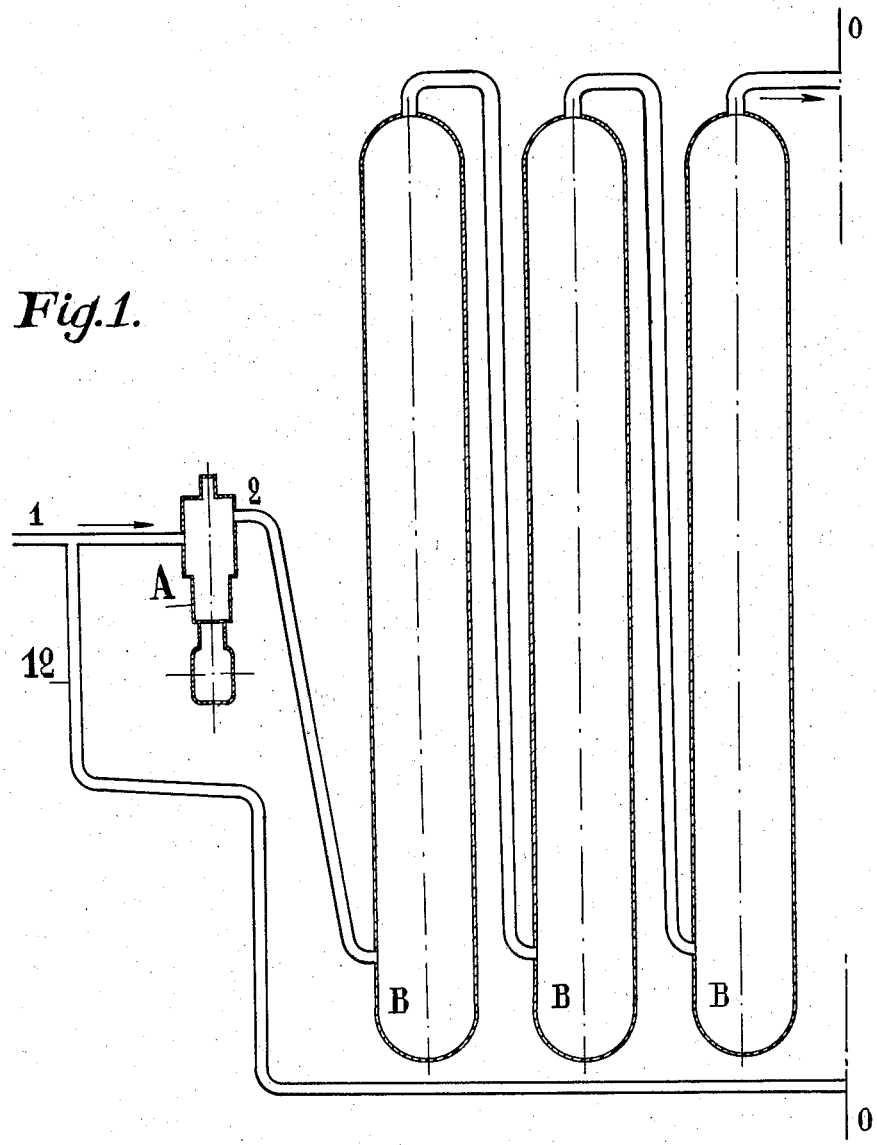

Patented Oct. 8, 1929

1,730,805

UNITED STATES PATENT OFFICE

GEORGES CLAUDE, OF PARIS, FRANCE, ASSIGNOR TO LA SOCIÉTÉ L'AIR LIQUIDE, SOCIÉTÉ ANONYME POUR L'ETUDE ET L'EXPLOITATION DES PROCÉDÉS GEORGES CLAUDE, OF PARIS, FRANCE

EXTRACTION OF HYDROGEN FROM GASEOUS MIXTURES

Application filed March 5, 1925, Serial No. 13,403, and in France March 8, 1924.

This invention relates to the extraction of hydrogen from gaseous mixtures.

In the extraction of hydrogen by partial liquefaction of mixtures such as coke-oven gas irregularities attributable to acetylene and other substances having a vapor pressure of somewhere about the same order have frequently been observed. When there is only a very small proportion of acetylene present in relation to a large quantity of ethylene in the gaseous mixture to be treated, it has been found that this acetylene is entirely carried away by solution in the ethylene when the gases to be treated are subjected to progressive cooling in temperature exchangers preceding the partial liquefaction or separating apparatus proper. In these exchangers, the extraction of ethylene and the removal by its aid of the acetylene and other impurities are effected by circulating the gases in an upward direction through the zone where the ethylene liquefies and up to the region where considerable liquefaction of the methane takes place, the ethylene being thereby progressively liquefied and the methane in the liquid so formed being vaporized by allowing the liquid to flow back in the opposite direction to the gases under treatment for a suitable distance to a collector from which the liquid containing ethylene together with other impurities such as ethane and acetylene is extracted. This process forms the subject of my prior application No. 744,823, filed October 20, 1924, and the present invention is essentially a development of or improvement on the same.

If however the quantity of ethylene present is not very large, it may happen that very small quantities of acetylene corresponding to an extremely low vapor pressure escape the dissolving action of the ethylene, pass through the temperature exchangers and reach the separating apparatus proper where their appearance, in a solid form, may after a certain time lead to troublesome obstructions.

This difficulty is overcome by means of the present invention which makes use of the great solubility of the acetylene in liquid ethylene. For this purpose the method employed consists in increasing the proportion of ethylene in the gases subjected to the treatment to the extent required for dissolving the acetylene or said other substances, by adding to the said gases a suitable proportion of ethylene practically free from acetylene and the other substances in question. The ethylene so added to the gases may be conveniently obtained from the gases by their treatment in the temperature exchangers in the manner described above and disclosed in my said prior application—that is to say, the ethylene used for this purpose may be the liquefied ethylene that accumulates in the collector and is withdrawn therefrom the portion of the extracted ethylene being previously freed from the greater quantity of the acetylene contained therein by rectification or an appropriate chemical process.

In consequence of this addition of ethylene the favorable conditions above indicated for the efficient working of the process are constantly maintained and the fluctuations in composition of the coke-oven gas are without any detrimental influence. As the process involves working in a closed circuit with a constant quantity of additional ethylene, there is no actual waste of this substance. The only additional expenditure is that of the energy necessary for the compression of the ethylene added, but this may be regarded as negligible as this addition will not in general exceed 5 per cent of the volume of the coke-oven gas treated.

The accompanying drawing shows diagrammatically, by way of example, an apparatus for carrying out the invention, as described above, in the case where the added ethylene is obtained from the recovered liquid containing ethylene.

Figure 2:
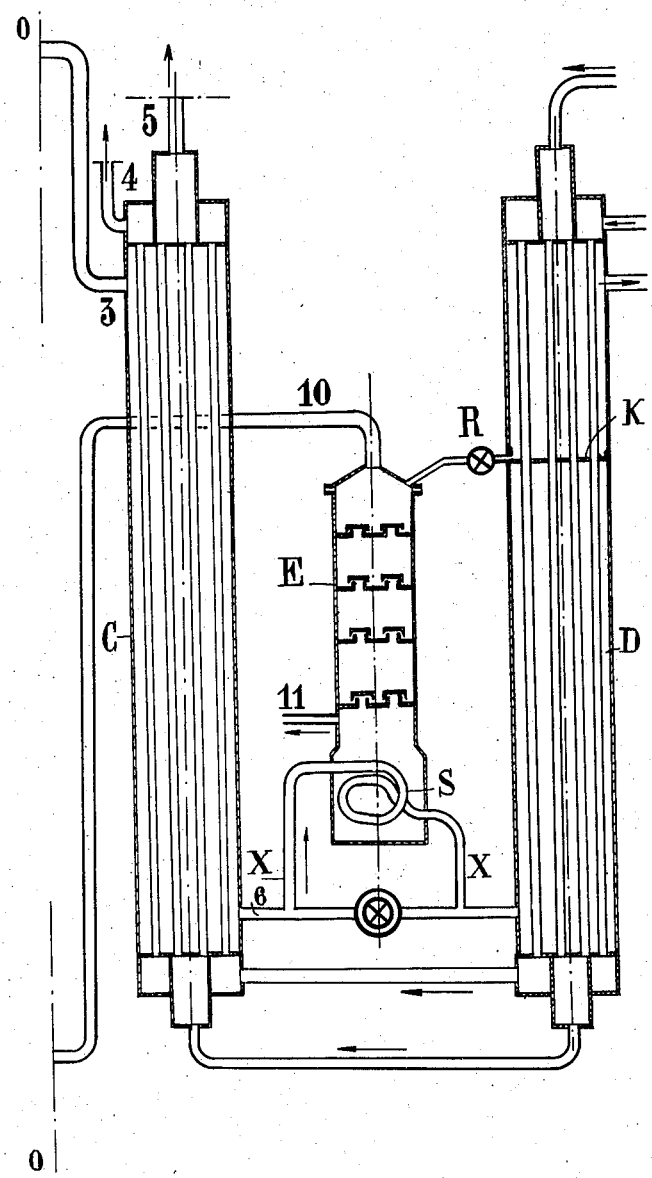

Figures 1 and 2 of said drawing jointly show the apparatus in question, Fig. 1 from the left-hand end to the line O—O, and Fig. 2 from the line O—O to the right-hand end.

A is the compressor for the coke-oven gas or the like, and B designates a plurality of towers for purifying the compressed gas which travels therein from bottom to top, while suitable agents are caused to flow in the opposite direction. C and D are temperature exchangers preceding the hydrogen-separating column proper (not shown), and E designates the column for rectifying the liquid containing ethylene.

The operation of this apparatus is as follows: The coke-oven gas is supplied through pipe 1 to compressor A which delivers it through pipe 2, the scrubbing towers B and pipe 3 to the first temperature exchanger C where its cooling begins; it passes then through pipe 6 to the other temperature exchanger D where it is further cooled. Toward the upper part of exchanger D liquefaction occurs which results in the collection on plate K of a liquid relatively rich in ethylene and containing together with some methane, acetylene and other impurities. This liquid is drawn off through valve R and delivered to the top of rectifying column E, the lower part of which is maintained at a relatively high temperature by circulating in coil S part of the cold compressed gas issuing from temperature exchanger C, such part passing through pipes X and being added afterward to the gases from which it has been obtained. The rectification in column E yields, on the one hand, a volatile part which chiefly contains methane and ethylene and which escapes from the upper part of the column E through pipe 10 and returns at 12 to the inlet of compressor A; and it also yields, on the other hand, a less-volatile part which contains, together with a certain quantity of methane and ethylene, the greatest part of the acetylene and other impurities, this less-volatile part escaping through pipe 11. Of course the cold of the products escaping through pipes 10 and 11 may be recovered if desired.

I claim as my invention:

1. In processes for the extraction of hydrogen by partial liquefaction of hydrogen-containing gaseous mixtures, in which the gases to be treated are subjected to progressive cooling in a temperature exchanger preceding the partial liquefaction apparatus proper, a method for eliminating irregularities due to the presence of small quantities of acetylene or other substances soluble in liquid ethylene, which method consists in increasing the proportion of ethylene in the gases subjected to the treatment to the extent required for dissolving the acetylene or said other substances by adding to the said gases a suitable proportion of ethylene practically free from acetylene or the other substances in question.

2. A process for the extraction of hydrogen by partial liquefaction of hydrogen-containing gaseous mixtures, comprising the steps of circulating the gases to be treated in an upward direction in a temperature exchanger to progressively cool the same through the zone where the ethylene in said gases liquefies and up to the region where a considerable liquefaction of the methane commences to take place; allowing the liquid thus obtained to flow back for a distance in the opposite direction to the travel of the gases to a collector so as to vaporize the methane; and then extracting the liquid from the collector and adding a suitable proportion thereof to the gases undergoing treatment to increase the proportion of ethylene therein.

3. A process for the extraction of hydrogen by partial liquefaction of hydrogen-containing gaseous mixtures, comprising the steps of circulating the gases to be treated in an upward direction in a temperature exchanger to progressively cool the same through the zone where the ethylene in said gases liquefies and up to the region where a considerable liquefaction of the methane commences to take place; allowing the liquid thus obtained to flow back for a distance in the opposite direction to the travel of the gases to a collector so as to vaporize the methane; extracting the liquid from the collector and substantially freeing it from acetylene and other impurities contained therein; and adding a suitable proportion of the purified product to the gases undergoing treatment to increase the proportion of ethylene therein.

4. A process for the extraction of hydrogen by partial liquefication of hydrogen-containing gaseous mixtures, comprising the steps of circulating the gases to be treated in an upward direction in a temperature exchanger to progressively cool the same through the zone where the ethylene in said gases liquefies and up to the region where a considerable liquefaction of the methane commences to take place; allowing the liquid thus obtained to flow back for a distance in the opposite direction to the travel of the gases to a collector so as to vaporize the methane; extracting the liquid from the collector, and then rectifying it to substantially free it from acetylene and other impurities contained therein; and adding a suitable proportion of the rectified product to the gases undergoing treatment to increase the proportion of ethylene therein.

5. A process for the extraction of hydrogen by partial liquefaction of hydrogen-containing gases, comprising the steps of progressively cooling the gases to be treated to the point where the ethylene in said gases liquefies and a considerable liquefaction of the methane commences to take place; collecting and extracting the product thus obtained; substantially freeing the extracted product from acetylene and other impurities; and adding to the gases undergoing treatment a suitable proportion of the purified product to increase the proportion of ethylene therein.

6. A process for the separation of acetylene and similar hydrocarbons from gaseous mixtures subjected to a liquefaction process, which comprises adding ethylene to the gaseous mixture and dissolving the acetylene and similar hydrocarbons in the liquid ethylene formed during the liquefaction process.

7. A process for the separation of acetylene and similar hydrocarbons from gaseous mixtures subjected to a liquefaction process, which comprises adding ethylene to the gaseous mixture, dissolving the acetylene and similar hydrocarbons in the liquid ethylene formed during the liquefaction process, substantially freeing the resultant liquid from acetylene and other impurities, and using the recovered ethylene again in the process.

In testimony whereof I affix my signature.

GEORGES CLAUDE.